United States Patent
Hirayama et al.

[11] Patent Number: 5,858,033
[45] Date of Patent: Jan. 12, 1999

[54] METHOD OF AND APPARATUS FOR FLUIDIZED-BED GASIFICATION AND MELT COMBUSTION

[75] Inventors: Yoshio Hirayama; Takahiro Oshita, both of Kanagawa-ken; Chikashi Tame, Tokyo; Shuichi Nagato, Kanagawa-ken; Tetsuhisa Hirose, Tokyo; Norihisa Miyoshi, Kanagawa-ken; Seiichiro Toyoda, Tokyo; Shugo Hosoda, Kanagawa-ken; Shosaku Fujinami; Kazuo Takano, both of Tokyo, all of Japan

[73] Assignee: Ebara Corporation, Tokyo, Japan

[21] Appl. No.: 915,322

[22] Filed: Aug. 20, 1997

Related U.S. Application Data

[62] Division of Ser. No. 547,126, Oct. 24, 1995, Pat. No. 5,725,614, which is a division of Ser. No. 401,370, Mar. 9, 1995, Pat. No. 5,620,488.

[30] Foreign Application Priority Data

| | | | |
|---|---|---|---|
| Mar. 10, 1994 | [JP] | Japan | 6-65439 |
| Apr. 15, 1994 | [JP] | Japan | 6-101541 |
| Feb. 9, 1995 | [JP] | Japan | 7-22000 |

[51] Int. Cl.⁶ .............. C01B 3/32; F23G 5/00; F23J 11/00; F27B 15/14

[52] U.S. Cl. .......... 48/198.6; 422/145; 422/146; 110/245; 110/344; 110/346

[58] Field of Search .............. 48/197 R, 198.6, 48/198.7; 422/146, 145; 110/234, 245, 344, 346; 202/109; 201/31, 22

[56] References Cited

U.S. PATENT DOCUMENTS

| | | | |
|---|---|---|---|
| 4,356,151 | 10/1982 | Woebcke et al. | 165/104.18 |
| 4,602,573 | 7/1986 | Tanca | 110/342 |
| 4,676,177 | 6/1987 | Engstrom | 110/345 |

(List continued on next page.)

FOREIGN PATENT DOCUMENTS

| | | |
|---|---|---|
| 0 072 102 | 2/1983 | European Pat. Off. |
| 0 436 056 | 7/1991 | European Pat. Off. |
| 2 660 415 | 10/1991 | France |
| 36 32 534 | 4/1987 | Germany |
| 54-38661 | 3/1979 | Japan |
| 54-117170 | 9/1979 | Japan |
| 56-3810 | 1/1981 | Japan |
| 61-105018 | 5/1986 | Japan |
| 63-172808 | 7/1988 | Japan |
| 64-84014 | 3/1989 | Japan |
| 2-147692 | 6/1990 | Japan |
| 2-157509 | 6/1990 | Japan |
| 6-307614 | 11/1994 | Japan |

*Primary Examiner*—Nina Bhat
*Attorney, Agent, or Firm*—Wenderoth, Lind & Ponack, L.L.P.

[57] ABSTRACT

A combustion method and apparatus in which combustible matter, e.g., waste matter, coal, etc., is gasified to produce a combustible gas containing a sufficiently large amount of combustible component to melt ash by its own heat. A fluidized-bed furnace has an approximately circular horizontal cross-sectional configuration. A moving bed, in which a fluidized medium settles and diffuses, is formed in the central portion of the furnace, and a fluidized bed, in which the fluidized medium is actively fluidized, is formed in the peripheral portion in the furnace. The fluidized medium is turned over to the upper part of the moving bed from the upper part of the fluidized bed, thus circulating through the two beds. Combustible matter is cast into the upper part of the moving bed and gasified to form a combustible gas while circulating, together with the fluidized medium. The amount of oxygen supplied to the fluidized-bed furnace is set so as to be not higher than 30% of the theoretical amount of oxygen required for combustion. The temperature of the fluidized bed is maintained at 450° C. to 650° C. so that the combustible gas produced contains a large amount of combustible component. The combustible gas and fine particles produced in the fluidized-bed furnace are supplied to a melt combustion furnace where they are burned at high temperature, and the resulting ash is melted.

36 Claims, 11 Drawing Sheets

U.S. PATENT DOCUMENTS

| | | | |
|---|---|---|---|
| 4,753,177 | 6/1988 | Engstrom et al. | 34/589 |
| 4,762,074 | 8/1988 | Sórensen | 110/346 |
| 4,823,740 | 4/1989 | Ohshita et al. | 122/4 D |
| 4,848,249 | 7/1989 | LePori et al. | 110/234 |
| 4,938,170 | 7/1990 | Ohshita et al. | 122/4 D |
| 4,971,599 | 11/1990 | Cordell et al. | 48/76 |
| 5,138,957 | 8/1992 | Morey et al. | 110/234 |
| 5,156,099 | 10/1992 | Ohshita et al. | 110/245 |
| 5,170,725 | 12/1992 | Sass et al. | 110/236 |
| 5,425,317 | 6/1995 | Schaub et al. | 110/346 |
| 5,445,087 | 8/1995 | Kaneko | 110/235 |
| 5,505,907 | 4/1996 | Hiltunen et al. | 422/146 |

5,858,033

METHOD OF AND APPARATUS FOR FLUIDIZED-BED GASIFICATION AND MELT COMBUSTION

This is a divisional application of Ser. No. 08/547,126, filed Oct. 24, 1997, now U.S. Pat. No. 5,725,614, which is a divisional application of Ser. No. 08/401,370, filed Mar. 9, 1995, now U.S. Pat. No. 5,620,488.

BACKGROUND OF THE INVENTION (Industrially Applicable Field)

The present invention relates to a method and an apparatus in which combustible matter is gasified in a fluidized-bed furnace, and the resulting combustible gas and fine particles are burned at high temperature in a melt combustion furnace, and the resulting ash is melted therein.

In recent years, it has been demanded to reduce the volume of wastes, e.g. municipal refuse, waste plastics, etc., which are generated in large amounts, by incineration, and to effectively use heat recovered from such incineration. Since ash resulting from incineration of waste matter generally contains harmful heavy metals, it is necessary to take some measures, e.g. solidification of the heavy metal component, to dispose of the burned ash by reclaiming. To cope with these problems, JP-B2-62-35004 (Japanese Patent Application Post-Examination Publication, KOKOKU) proposes a method of and apparatus for burning solid matter. In the proposed combustion method, a solid material is thermally decomposed in a fluidized-bed pyrolysis furnace, and pyrolysis products, that is, a combustible gas and particles, are introduced into a cyclone combustion furnace, in which the combustible component is burned at high intensity by pressurized air, and the ash is caused to collide with the wall surface by swirl and thus be melted. The molten ash flows down on the wall surface, and the resulting molten slag drops from a discharge opening into a water chamber where it is solidified.

The method disclosed in JP-B2-62-35004 suffers, however, from the disadvantage that, since the entire fluidized bed is in an actively fluidized state, a large amount of unreacted combustible component is carried to the outside of the furnace on the combustible gas produced in the furnace. Therefore, high gasification efficiency cannot be obtained. Further, gasification materials usable in fluidized-bed furnaces have heretofore been small coal having a particle diameter in the range of from 0.5 mm to 3 mm, and finely-crushed waste matter of several millimeters in size. Gasification material that is larger in size than the above will obstruct fluidization; gasification material that is smaller in size than the above will be carried to the outside of the furnace with the combustible gas as unreacted combustible component without being completely gasified. Accordingly, the conventional fluidized-bed furnaces necessitate previously crushing a gasification material and making the resulting particles uniform in size by using a crusher or the like as a pretreatment which is carried out before the gasification material is cast into the furnace. Thus, gasification materials which do not fall within a predetermined particle diameter range cannot be used, and the yield must be sacrificed to some extent.

To solve the above-described problem, JP-A-2-147692 (Japanese Patent Application Public Disclosure, KOKAI) proposes a fluidized-bed gasification method and fluidized-bed gasification furnace. In the fluidized-bed gasification method disclosed in this publication, the furnace has a rectangular horizontal cross-sectional configuration, and the mass velocity of a fluidizing gas jetted out upwardly into the furnace from the central portion of the furnace bottom is set lower than the mass velocity of a fluidizing gas supplied from two side edge portions of the furnace bottom. The upward stream of the fluidizing gas is turned over to the central portion of the furnace at a position above each side edge portion of the furnace bottom. Thus, a moving bed in which a fluidized medium settles is formed in the central portion of the furnace, and a fluidized bed in which the fluidized medium is actively fluidized is formed in each side edge portion of the furnace. Combustible matter is supplied to the moving bed. The fluidizing gas is either a mixture of air and steam, or a mixture of oxygen and steam, and the fluidized medium is siliceous sand.

However, the method of JP-A-2-147692 has the following disadvantages:

(1) A gasification endothermic reaction and a combustion reaction simultaneously take place in all the moving and fluidized beds. Accordingly, a volatile component, which is readily gasified, is burned at the same time as it is gasified, whereas, fixed carbon (char) and tar, which are difficult to gasify, are carried, as unreacted matter, to the outside of the furnace with the combustible gas produced in the furnace. Thus, high gasification efficiency cannot be obtained.

(2) In a case where the combustible gas produced in the furnace is burned for use in a steam and gas turbine combined-cycle power generation plant, the fluidized-bed furnace must be of the pressurized type. In this case, however, since the furnace has a rectangular horizontal cross-sectional configuration, it is difficult to construct the furnace in the form of a pressurized furnace. Preferable gasification furnace pressure is determined by the application of the combustible gas produced. In a case where the gas is used as an ordinary gas for combustion, the furnace pressure may be of the order of several thousands of mmAq. However, in a case where the combustible gas produced is used as a fuel for a gas turbine, the furnace pressure must be as high as several $kgf/cm^2$. When the gas is used as a fuel for high-efficiency gasification combined-cycle power generation, a furnace pressure higher than ten-odd $kgf/cm^2$ is suitably used.

In treatment of wastes such as municipal refuse, volumetric reduction by burning combustible refuse still plays an important role. In relation to incineration, there has recently been an increasing demand for environmental protection-type refuse treatment techniques, e.g. dioxin-control measures, techniques for making smoke dust harmless, improvements in energy recovery efficiency, etc. The rate of incineration of municipal refuse in Japan is about 100,000 tons/day, and energy recovered from such municipal refuse is equivalent to about 4% of the electric energy consumed in Japan. At present, the municipal refuse energy utilization factor is as low as about 10%. However, if the energy utilization factor can be increased, the rate of consumption of fossil fuel decreases correspondingly, so that it is possible to contribute to the prevention of global warming.

However, the existing incineration system involves the following problems:

① The power generation efficiency cannot be increased because of the problem of corrosion by HCl.

② Environmental pollution prevention equipment.for controlling HCl, $NO_x$, $SO_x$, mercury, dioxins, etc. has become complicated, resulting in increased cost and space requirements.

③ There is an increasing tendency to install burned ash melting equipment on account of tightening of regulations, difficulty in ensuring a site for final disposal, and so forth. For this purpose, however, additional equipment must be constructed, and a great deal of electric power is consumed.

④ Costly equipment is needed to remove dioxins.

⑤ It is difficult to recover valuable metals.

SUMMARY OF THE INVENTION (Problems to be Solved by the Invention)

An object of the present invention is to solve the above-described problems of the related art and to produce a combustible gas at high efficiency, which contains a large amount of combustible component, from combustible matter such as wastes, e.g. municipal refuse, waste plastics, etc., or combustible matter such as coal.

Another object of the present invention is to provide a method of and apparatus for gasifying combustible matter, which are suitable for recovery of energy and which can readily produce a high-pressure combustible gas.

Still another object of the present invention is to provide a gasification and melt combustion method and apparatus which are capable of producing a combustible gas containing a large amount of combustible component and of melting ash by the heat of the combustible gas produced.

A further object of the present invention is to provide combustible gas of a homogeneous gas containing char and tar with a sufficiently high calorific value to generate a high temperature of 1,300° C. or higher by its own heat.

A further object of the present invention is provide a gasification apparatus in which incombustible matter can be smoothly discharged therefrom without any problem.

A further object of the present invention is to provide a gasification method and apparatus which enable valuable metals contained in waste matter to be recovered from a fluidized-bed furnace having a reducing atmosphere without being oxidized.

(Means for Solving the Problems)

The present invention provides a method of gasifying combustible matter in a fluidized-bed furnace to produce a combustible gas. In the method of the present invention, the fluidized-bed furnace has an approximately circular horizontal cross-sectional configuration. A fluidizing gas which is supplied to the fluidized-bed furnace includes a central fluidizing gas which is supplied as an upward stream from the central portion of the bottom of the furnace to the inside of the furnace, and a peripheral fluidizing gas which is supplied as an upward stream from the peripheral portion of the furnace bottom to the inside of the furnace. The central fluidizing gas has a lower mass velocity than that of the peripheral fluidizing gas. The upward stream of fluidizing gas and fluidized medium in the upper part of the peripheral portion in the furnace is turned over or deflected to the central portion of the furnace by an inclined wall, thereby forming a moving bed, in which a fluidized medium (generally, siliceous sand) settles and diffuses, in the central portion of the furnace, and also forming a fluidized bed, in which the fluidized medium is actively fluidized, in the peripheral portion in the furnace, so that combustible matter which is supplied into the furnace is gasified to form a combustible gas while circulating, together with the fluidized medium, from the lower part of the moving bed to the fluidized bed and from the top of the fluidized bed to the moving bed. The oxygen content of the central fluidizing gas is set not higher than that of the peripheral fluidizing gas, and the temperature of the fluidized bed is maintained in a range of from 450° C. to 650° C.

In the present invention, the central fluidizing gas is one selected from three gases, i.e. steam, a gaseous mixture of steam and air, and air. The peripheral fluidizing gas is one selected from three gases, i.e. oxygen, a gaseous mixture of oxygen and air, and air. Accordingly, there are nine ways of combining together the central and peripheral fluidizing gases, as shown in Table 1. An appropriate combination may be selected according to whether importance is attached to gasification efficiency or to economy.

In Table 1, combination No. 1 provides the highest gasification efficiency. However, since the amount of oxygen consumption is large, the cost is high. The gasification efficiency reduces, firstly, as the amount of oxygen consumption decreases, and secondly, as the amount of steam consumption decreases. In this case, the cost also reduces. Oxygen usable in the present invention may be high-purity oxygen. It is also possible to use low-purity oxygen which is obtained by using an oxygen enrichment membrane. Combination No. 9, which is a combination of air and air, is known as combustion air for conventional incinerators. In the present invention, the fluidized-bed furnace has a circular horizontal cross-sectional configuration, and therefore, the lower projected area of an inclined wall which is provided at the upper side of the peripheral portion in the furnace is larger than the lower projected area of an inclined wall which is used in a case where the fluidized-bed furnace has a rectangular horizontal cross-sectional area. Therefore, the flow rate of peripheral fluidizing gas can be increased, and hence the oxygen supply can be increased. Accordingly, the gasification efficiency can be increased.

TABLE 1

| No. | Furnace Central Portion | Furnace Peripheral Portion |
|---|---|---|
| 1 | Steam | Oxygen |
| 2 | " | Oxygen and Air |
| 3 | " | Air |
| 4 | Steam and Air | Oxygen |
| 5 | " | Oxygen and Air |
| 6 | " | Air |
| 7 | Air | Oxygen |
| 8 | " | Oxygen and Air |
| 9 | " | Air |

Preferably, in the method of the present invention, the fluidizing gas further includes an intermediate fluidizing gas which is supplied to the inside of the furnace from an intermediate portion of the furnace bottom between the central and peripheral portions of the furnace bottom. The intermediate fluidizing gas has a mass velocity which is intermediate between the mass velocity of the central fluidizing gas and the mass velocity of the peripheral fluidizing gas. The intermediate fluidizing gas is one of two gases, i.e. a gaseous mixture of steam and air, and air. Accordingly, there are 18 ways of combining together the central, intermediate and peripheral fluidizing gases. The oxygen content is preferably set so as to increase gradually from the central portion to the peripheral portion of the furnace. There are 15 preferable combinations of gases as shown in Table 2.

TABLE 2

| No. | Furnace Central Portion | Furnace Intermediate Portion | Furnace Peripheral Portion |
| --- | --- | --- | --- |
| 1 | Steam | Steam and Air | Oxygen |
| 2 | " | " | Oxygen and Air |
| 3 | " | " | Air |
| 4 | Steam | Air | Oxygen |
| 5 | " | " | Oxygen and Air |
| 6 | " | " | Air |
| 7 | Steam and Air | Steam and Air | Oxygen |
| 8 | " | " | Oxygen and Air |
| 9 | " | " | Air |
| 10 | Steam and Air | Air | Oxygen |
| 11 | " | " | Oxygen and Air |
| 12 | " | " | Air |
| 13 | Air | Air | Oxygen |
| 14 | " | " | Oxygen and Air |
| 15 | " | " | Air |

An appropriate combination may be selected from among those shown in Table 2 according to whether importance is attached to gasification efficiency or to economy. In Table 2, combination No. 1 provides the highest gasification efficiency. However, since the amount of oxygen consumption is large, the cost is high. The gasification efficiency reduces, firstly, as the amount of oxygen consumption decreases, and secondly, as the amount of steam consumption decreases. In this case, the cost also reduces. Oxygen usable in Tables 1 and 2 may be high-purity oxygen. It is also possible to use low-purity oxygen which is obtained by using an oxygen enrichment membrane.

When the fluidized-bed furnace is large in size, the intermediate fluidizing gas preferably includes a plurality of fluidizing gases which are supplied from a plurality of concentrical intermediate portions provided between the central and peripheral portions of the furnace bottom. In this case, the oxygen density of the fluidizing gas is preferably set so that oxygen density is the lowest in the central portion of the furnace, and it gradually rises toward the peripheral portion of the furnace.

In the method of the present invention, the fluidizing gas that is supplied to the fluidized-bed furnace contains an amount of oxygen not higher than 30% of the theoretical amount of oxygen required for combustion of combustible matter. Incombustible matter is taken out of the fluidized-bed furnace from a peripheral portion of the furnace bottom and classified, and sand obtained by the classification is returned to the inside of the fluidized-bed furnace. The combustible gas and fine particles produced in the fluidized-bed furnace are burned at a high temperature of 1,300° C. or higher in a melt combustion furnace, i.e. a melting furnace, and the ash is melted therein. Exhaust gas from the melt combustion furnace is used to drive a gas turbine. The pressure in the fluidized-bed furnace is maintained at a level not lower than or above atmospheric pressure according to its usage. The combustible matter, may be waste matter coal, and so forth.

In addition, the present invention provides an apparatus for gasifying combustible matter in a fluidized-bed furnace to produce a combustible gas. The fluidized-bed furnace includes the following constituent elements: a side wall having an approximately circular horizontal cross-sectional configuration; a fluidizing gas dispersing mechanism which is disposed in the bottom portion of the furnace; an incombustible matter outlet which is disposed at the outer periphery of the fluidizing gas dispersing mechanism; a central supply device for supplying a fluidizing gas to the inside of the furnace from a central portion of the fluidizing gas dispersing mechanism so that the fluidizing gas flows vertically upward; a peripheral supply device for supplying a fluidizing gas to the inside of the furnace from a peripheral portion of the fluidizing gas dispersing mechanism so that the fluidizing gas flows vertically upward; an inclined wall for turning over the fluidizing gas and fluidized medium flowing vertically upward to the central portion of the furnace at a position above the peripheral supply device; and a free board which is disposed above the inclined wall. The central supply device supplies a fluidizing gas having a relatively low mass velocity and a relatively low oxygen density. The peripheral supply device supplies a fluidizing gas having a relatively high mass velocity and a relatively high oxygen density.

In the apparatus of the present invention, the fluidized-bed furnace may further include an intermediate supply device for supplying a fluidizing gas to the inside of the furnace from a ring-shaped intermediate portion between the central and peripheral portions of the fluidizing gas dispersing mechanism so that the fluidizing gas flows vertically upward. The intermediate supply device supplies a fluidizing gas having a mass velocity which is intermediate between the mass velocities of the fluidizing gases supplied by the central and peripheral supply devices, and an oxygen density which is intermediate between the oxygen densities of the fluidizing gases supplied by the central and peripheral supply devices. The peripheral supply device may be a ring-shaped supply box. The fluidized-bed furnace may further include a combustible matter inlet which is disposed in the upper part of the fluidized-bed furnace. The combustible matter inlet may be arranged to drop combustible matter into a space above the central supply device. The fluidizing gas dispersing mechanism may be formed so that the peripheral portion thereof is lower than the central portion thereof.

The incombustible matter outlet may have a ring-shaped portion which is disposed at the outer periphery of the fluidizing gas dispersing mechanism, and a conical portion which extends downward from the ring-shaped portion so as to contract as the distance from the ring-shaped portion increases in the downward direction. The incombustible matter outlet may have a volume regulating discharger, a first swing valve for sealing, a swing cut-off valve, a second swing valve for sealing, which are arranged in series.

The apparatus of the present invention may include a melt combustion furnace, i.e. a melting furnace, in which the combustible gas and fine particles produced in the fluidized-bed furnace are burned at high temperature, and the resulting ash is melted. The melt combustion furnace has a cylindrical primary combustion chamber with an approximately vertical axis, and a combustible gas inlet for supplying the combustible gas and fine particles produced in the fluidized-bed furnace into the cylindrical primary combustion chamber so that the combustible gas and fine particles circle about the axis of the primary combustion chamber. The melt combustion furnace further has a secondary combustion chamber which is communicated with the cylindrical primary combustion chamber, and a discharge opening which is provided in the lower part of the secondary combustion chamber so that molten ash can be discharged from the discharge opening. Exhaust gas from the secondary combustion chamber of the melt combustion furnace is introduced into a waste heat boiler and an air preheater, thereby recovering waste heat. Exhaust gas from the secondary combustion chamber of the melt combustion furnace may be used to drive a gas turbine. Exhaust gas may be introduced into a dust collector where dust is removed before being released into the atmosphere.

(Function)

In the method or apparatus of the present invention, the fluidized-bed furnace has an approximately circular horizontal cross-sectional configuration, and hence a pressure-resistance furnace structure can be formed. Thus, the pressure in the fluidized-bed furnace can be maintained at a level not lower than the atmospheric pressure, and it is easy to raise the pressure of a combustible gas produced from combustible matter supplied into the furnace. The high-pressure combustible gas can be used as a fuel for a gas turbine or boiler-gas turbine combined-cycle power plant which can be run at high efficiency. Therefore, the use of the combustible gas in such a plant makes it possible to increase the efficiency of energy recovery from combustible matter.

In the method and apparatus of the present invention, when the purpose thereof is to process wastes, the pressure in the fluidized-bed furnace is preferably maintained at a level not higher than the atmospheric pressure in order to prevent leakages of an odious smell or a harmful combustion gas from the furnace. In such case, the furnace wall can also resist well the pressure difference between the inside and the outside of the furnace wall, since the furnace has an approximately circular horizontal cross-sectional configuration.

In the present invention, the mass velocity of the central fluidizing gas supplied into the fluidized-bed furnace is set lower than the mass velocity of the peripheral fluidizing gas, and the upward stream of fluidizing gas in the upper part of the peripheral portion in the furnace is turned over to the central portion of the furnace, thereby forming a moving bed, in which a fluidized medium settles and diffuses, in the central portion of the furnace, and also forming a fluidized bed, in which the fluidized medium is actively fluidized, in the peripheral portion in the furnace. Thus, combustible matter which is supplied into the furnace is gasified to form a combustible gas while circulating, together with the fluidized medium, from the lower part of the moving bed to the fluidized bed and from the top of the fluidized bed to the moving bed. First, mainly a volatile component of combustible matter is gasified by the heat of the fluidized medium (generally, siliceous sand) in the moving bed which moves downward in the center of the furnace. Since the oxygen content of the central fluidizing gas, which forms the moving bed, is relatively low, the combustible gas produced in the moving bed is not practically burned, but it is moved upward to the free board, together with the central fluidizing gas, thereby forming a high-calorific value combustible gas of good quality.

The combustible matter, i.e. fixed carbon (char) and tar, which has lost its volatile component and been heated in the moving bed, is then circulated into the fluidized bed and burned by contact with the peripheral fluidizing gas, which has a relatively high oxygen content, in the fluidized bed, thereby changing into a combustion gas and ash, and also generating heat of combustion which maintains the inside of the furnace at a temperature in the range of from 450° to 650° C. The fluidized medium is heated by the heat of combustion, and the heated fluidized medium is turned over to the central portion of the furnace in the upper part of the peripheral portion of the furnace and then moves downward in the moving bed, thereby maintaining the temperature in the moving bed at the level required for gasification of the volatile component. Since the whole furnace, in particular central portion of the furnace, is placed under low-oxygen condition, it is possible to produce a combustible gas having a high content of combustible component. Further, metals contained in the combustible matter can be recovered as non-oxidized valuable matter from the incombustible matter outlet.

In the present invention, the combustible gas and ash, together with other fine particles, which are produced in the fluidized-bed furnace, may be burned in the melt combustion furnace. In such a case, since the combustible gas contains a large amount of combustible component, the temperature in the melt combustion furnace can be raised to a high level, i.e. 1,300° C. or higher, without the need for a fuel for heating. Thus, the ash can be sufficiently melted in the melt combustion furnace. The molten ash can be taken out of the melt combustion furnace, and it can be readily solidified by a known method, e.g. water cooling. Accordingly, the volume of ash is considerably reduced, and harmful metals contained in the ash are solidified. Therefore, the ash can be changed into a form capable of reclaiming disposal.

The above and other objects, features and advantages of the present invention will become more apparent from the following description of the preferred embodiments thereof, taken in conjunction with the accompanying drawings, in which like reference numerals denote like elements.

DETAILED DESCRIPTION OF THE PREFERRED EMBODIMENTS

Figure 1:
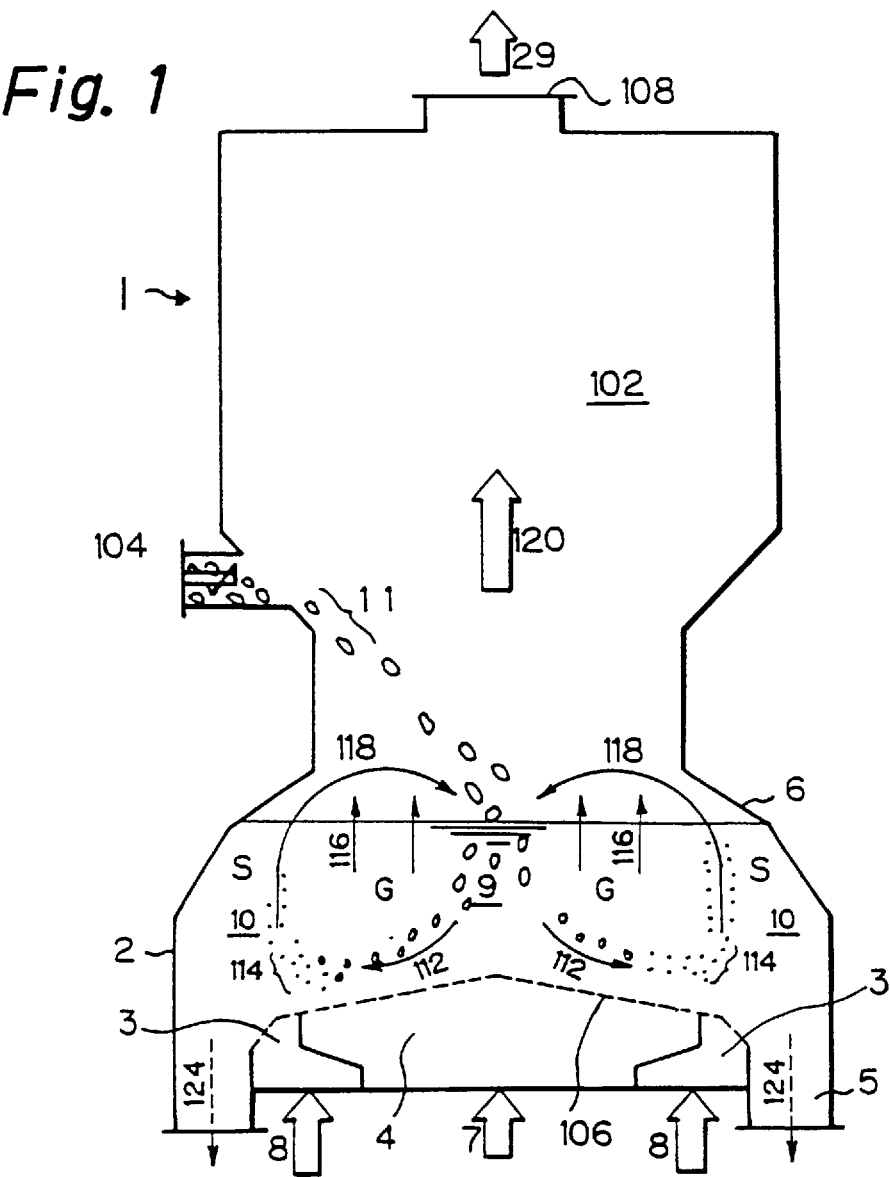
FIG. 1 is a schematic vertical sectional view showing an essential part of a gasification apparatus according to a first embodiment of the present invention.

Embodiments of the present invention will be described below in detail with reference to the accompanying drawings. It should, however, be noted that the present invention is not necessarily limited to these embodiments. Further, in FIGS. 1 to 14, members which are denoted by the same reference numerals are the same or corresponding members, and redundant description thereof is omitted.

Figure 2:
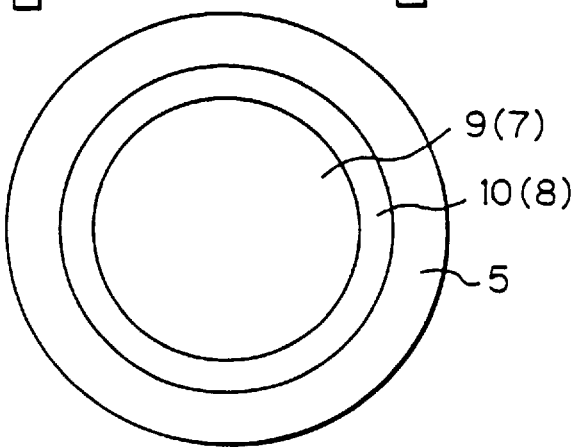
FIG. 2 is a schematic horizontal sectional view of a fluidized-bed furnace in the gasification apparatus shown in FIG. 1.

FIG. 1 is a schematic vertical sectional view showing an essential part of a gasification apparatus 1 according to a first embodiment for carrying out the gasification method of the present invention. FIG. 2 is a schematic horizontal sectional view of a fluidized-bed furnace in the gasification apparatus shown in FIG. 1. Referring to FIG. 1, the gasification apparatus 1 has a fluidized-bed furnace 2. A fluidizing gas is supplied into the fluidized-bed furnace 2 through a fluidizing gas dispersing mechanism 106 which is disposed in the bottom of the furnace 2. The fluidizing gas consists essentially of a central fluidizing gas 7 which is supplied from a central portion 4 of the furnace bottom to the inside of the furnace 2 as an upward stream, and a peripheral fluidizing gas 8 which is supplied from a peripheral portion 3 of the furnace bottom to the inside of the furnace 2 as an upward stream.

As shown in Table 1, the central fluidizing gas 7 is one of three gases, i.e. steam, a gaseous mixture of steam and air, and air, and the peripheral fluidizing gas 8 is one of three gases, i.e. oxygen, a gaseous mixture of oxygen and air, and air. The oxygen content of the central fluidizing gas 7 is set lower than the oxygen content of the peripheral fluidizing gas 8. The amount of oxygen in the entire quantity of fluidizing gas is set so as to be not higher than 30% of the theoretical amount of oxygen required for combustion of combustible matter 11. The inside of the furnace 2 is held under a reducing atmosphere condition.

The mass velocity of the central fluidizing gas 7 is set lower than that of the peripheral fluidizing gas 8, and the upward stream of fluidizing gas in the upper part of the peripheral portion in the furnace 2 is turned over to the central portion of the furnace 2 by the action of a deflector 6. Thus, a moving bed 9, in which a fluidized medium (generally, siliceous sand) settles and diffuses, is formed in the central portion of the furnace 2, and a fluidized bed 10, in which the fluidized medium is actively fluidized, is formed in the peripheral portion of the fluidized-bed furnace 2. The fluidized medium moves upwardly in the fluidized bed 10 in the furnace peripheral portion, as shown by the arrows 118. Then, the fluidized medium is turned over by the deflector 6 so as to flow into the upper part of the moving bed 9, and moves downwardly in the moving bed 9. Then, the fluidized medium moves along the gas dispersing mechanism 106 to flow into the lower part of the fluidized bed 10, as shown by the arrows 112. In this way, the fluidized medium circulates through the fluidized and moving beds 10 and 9, as shown by the arrows 118 and 112.

Combustible matter 11 is fed into the upper part of the moving bed 9 from a combustible matter feed opening 104.

The combustible matter 11 moves downwardly in the moving bed 9, together with the fluidized medium, and while doing so, the combustible matter 11 is heated by the heated fluidized medium, thereby allowing mainly the volatile component in the combustible matter 11 to be gasified. Since there is no or only a small amount of oxygen in the moving bed 9, the gas produced, which consists mainly of the gasified volatile component, is not burned, but passes through the moving bed 9, as shown by the arrows 116. Therefore, the moving bed 9 forms a gasification zone G. The produced gas then moves to a free board 102 where it moves upwardly, as shown by the arrow 120, and is then discharged from a gas outlet 108 as a combustible gas 29.

Matter which is not gasified in the moving bed 9, mainly char (fixed carbon component) and tar 114, moves from the lower part of the moving bed 9 to the lower part of the fluidized bed 10 in the peripheral portion of the furnace 2, together with the fluidized medium, as shown by the arrows 112, and is burned by the peripheral fluidizing gas 8 having a relatively high oxygen content and thus partially oxidized. The fluidized bed 10 forms a combustible matter oxidizing zone S. In the fluidized bed 10, the fluidized medium is heated to a high temperature by the heat of combustion in the fluidized bed 10. The fluidized medium heated to a high temperature is turned aside by an inclined wall 6 to move to the moving bed 9, as shown by the arrows 118, thereby serving as a heat source for further gasification. The temperature of the fluidized bed 10 is maintained in the range of from 450° C. to 650° C., thereby enabling an effectively controlled combustion reaction to continue.

According to the gasification apparatus 1 shown in FIGS. 1 and 2, the gasification zone G and the oxidation zone S are formed in the fluidized-bed furnace 2, and the fluidized medium is allowed to serve as a heat transfer medium in the two zones G and S. Thus, a high-calorific value combustible gas of good quality is produced in the gasification zone G, and the char and tar 114, which is difficult to gasify, can be efficiently burned in the oxidation zone S. Therefore, gasification efficiency of the combustible matter can be increased, and a combustible gas of good quality can be produced.

As shown in FIG. 2, which is a horizontal sectional view of the fluidized-bed furnace 2, the moving bed 9, which forms the gasification zone G, is circularly formed in the furnace central portion, and the fluidized bed 10, which forms the oxidation zone S, is annularly formed around the moving bed 9. A ring-shaped incombustible matter discharge opening 5 is disposed around the periphery of the fluidized bed 10. By forming the gasification apparatus 1 in a cylindrical configuration, a high furnace pressure can be readily borne. It is also possible to provide a pressure vessel (not shown) separately outside the gasification apparatus 1 in place of the structure in which the furnace pressure is borne by the gasification furnace itself.

Figure 3:
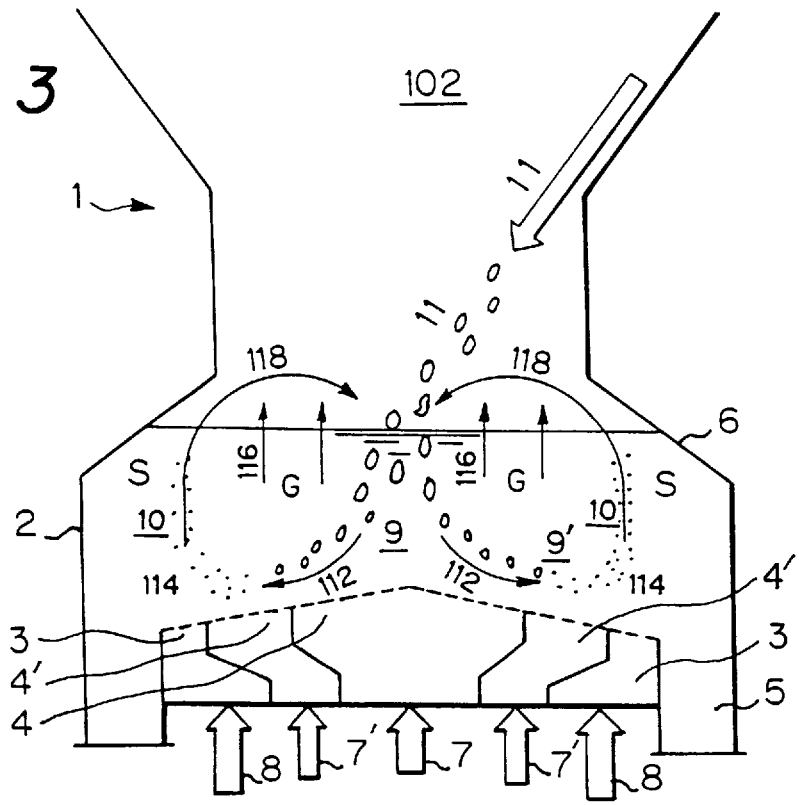
FIG. 3 is a schematic vertical sectional view of an essential part of a gasification apparatus according to a second embodiment of the present invention.
Figure 4:
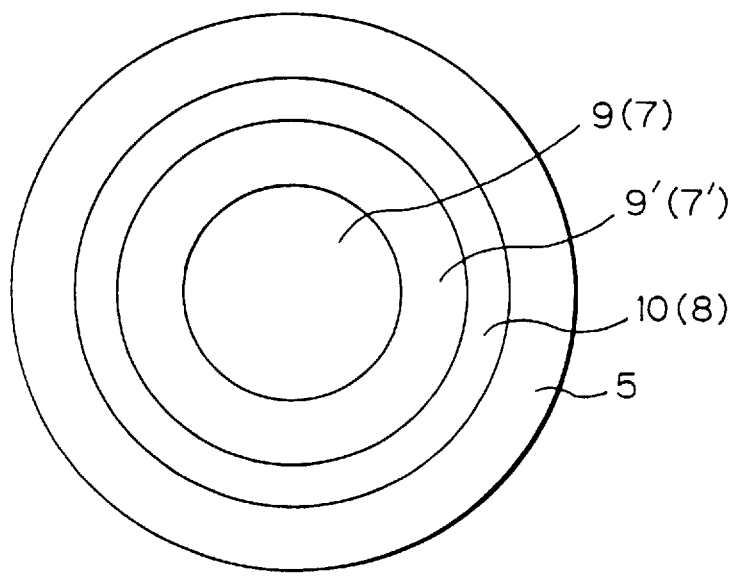
FIG. 4 is a schematic horizontal sectional view of a fluidized-bed furnace in the gasification apparatus shown in FIG. 3.

FIG. 3 is a schematic vertical sectional view of an essential part of a gasification apparatus according to a second embodiment for carrying the gasification method of the present invention. FIG. 4 is a schematic horizontal sectional view of a fluidized-bed furnace in the gasification apparatus shown in FIG. 3. In the gasification apparatus of the second embodiment, shown in FIG. 3, a fluidizing gas includes an intermediate fluidizing gas 7' which is supplied into the fluidized-bed furnace 2 from a furnace bottom intermediate portion between the furnace bottom central and peripheral portions, in addition to the central fluidizing gas 7 and the peripheral fluidizing gas 8. The mass velocity of the intermediate fluidizing gas 7' is selected as being intermediate between the mass velocities of the central and peripheral fluidizing gases 7 and 8. The intermediate fluidizing gas 7' is one of three gases, i.e. steam, a gaseous mixture of steam and air, and air.

In the gasification apparatus shown in FIG. 3, the central fluidizing gas 7 is one of three gases, i.e. steam, a gaseous mixture of steam and air, and air, and the peripheral fluidizing gas 8 is one of three gases, i.e. oxygen, a gaseous mixture of oxygen and air; and air, in the same way as in the case of the gasification apparatus shown in FIG. 1. The oxygen content of the intermediate fluidizing gas 7' is selected as being intermediate between the oxygen contents of the central and peripheral fluidizing gases 7 and 8. Therefore, there are 15 preferable combinations of fluidizing gases, as shown in Table 2. It is important for each combination that the oxygen content should increase as the distance from the center of the fluidized-bed furnace 2 increases toward the peripheral portion thereof. The amount of oxygen in the entire amount of fluidizing gas is set so as to be not higher than 30% of the theoretical amount of oxygen required for combustion of combustible matter 11. The inside of the furnace 2 is held under a reducing atmosphere condition.

In the gasification apparatus shown in FIG. 3, a moving bed 9, in which a fluidized medium settles and diffuses, is formed in the central portion of the furnace 2, and a fluidized bed 10, in which the fluidized medium is actively fluidized, is formed in the peripheral portion of the fluidized-bed furnace 2, in the same way as in the case of the gasification apparatus shown in FIG. 1. The fluidized medium circulates through the moving and fluidized beds 9 and 10, as shown by the arrows 118 and 112. An intermediate bed 9', in which the fluidized medium diffuses mainly in the horizontal direction, is formed between the moving bed 9 and fluidized bed 10. The moving bed 9 and the intermediate bed 9' form a gasification zone G, and the fluidized bed 10 forms an oxidation zone S.

Combustible matter 11, which is cast into the upper part of the moving bed 9, is heated while moving downwardly in the moving bed 9 together with the fluidized medium, thereby enabling the volatile component in the combustible matter 11 to be gasified. Char and tar, together with a part of the volatile component, which were not gasified in the moving bed 9, move to the intermediate bed 9' and the fluidized bed 10, together with the fluidized medium, thereby being partially gasified and partially burned. Matter that is not gasified in the intermediate bed 9', mainly char and tar, moves into the fluidized bed 10 in the furnace peripheral portion, together with the fluidized medium, and is burned in the peripheral fluidizing gas 8 having a relatively high oxygen content. The fluidized medium is heated in the fluidized bed 10 and then circulates to the moving bed 9 where it heats combustible matter in the moving bed 9. The oxygen density in the intermediate bed 9' is selected according to the type of combustible matter (i.e. whether the volatile content is high or the char and tar content is high). That is, it is decided according to the type of combustible matter whether the oxygen density should be made low to mainly perform gasification, or the oxygen density should be made high to mainly perform oxidation combustion.

As shown in FIG. 4, which is a horizontal sectional view of the fluidized-bed furnace 2, the moving bed 9, which forms a gasification zone, is circularly formed in the central portion of the furnace 2, and the intermediate bed 9' is formed from the intermediate fluidizing gas 7' along the outer periphery of the moving bed 9. The fluidized bed 10, which forms an oxidation zone, is annularly formed around the intermediate bed 9'. A ring-shaped incombustible matter discharge opening 5 is disposed around the periphery of the fluidized bed 10. By forming the gasification apparatus 1 in a cylindrical configuration, a high furnace pressure can be readily borne. The furnace pressure may be borne by the gasification apparatus itself, or by a pressure vessel which is separately provided outside the gasification apparatus.

Figure 5:
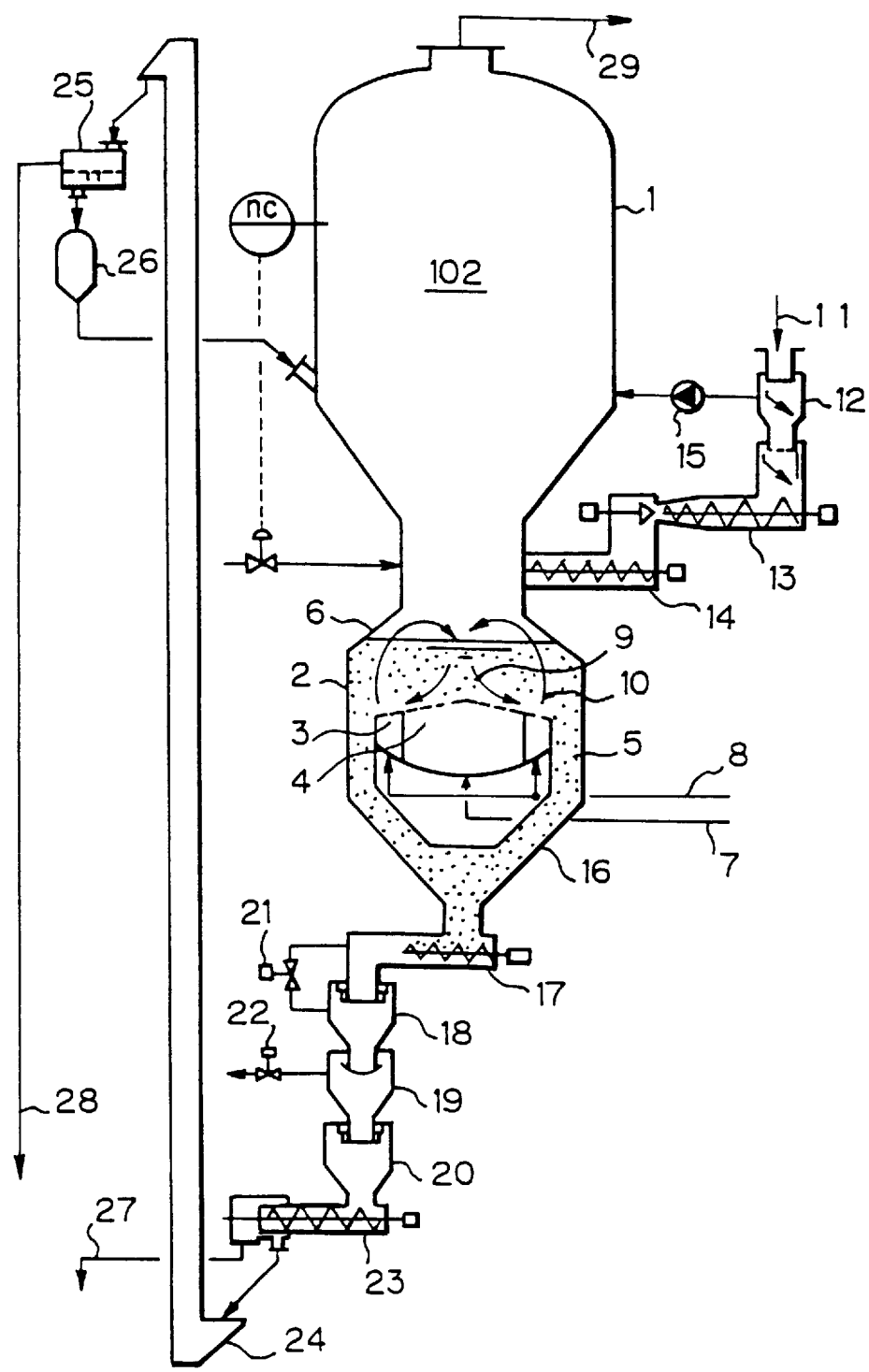
FIG. 5 is a schematic vertical sectional view of a gasification apparatus according to a third embodiment of the present invention.

FIG. 5 is a schematic vertical sectional view of a gasification apparatus according to a third embodiment of the present invention. In the gasification apparatus 1 shown in FIG. 5, a gasification material 11 which is combustible matter, e.g. refuse, is supplied to a fluidized-bed furnace 2 by a double damper 12, a compression feeder 13, and a refuse feeder 14. The compression feeder 13 compresses the gasification material 11 into a plug-like shape, thereby allowing the furnace pressure to be sealed. The refuse compressed in a plug-like shape is disintegrated by a disintegrator (not shown) and fed into the fluidized-bed furnace 2 by the refuse feeder 14.

In the gasification apparatus shown in FIG. 5, the central fluidizing gas 7 and the peripheral fluidizing gas 8 are supplied in the same way as in the embodiment shown in FIG. 1. Therefore, gasification and oxidation zones of reducing atmosphere are formed in the fluidized-bed furnace 2 in the same way as in the embodiment shown in FIG. 1. The fluidized medium serves as a heat transfer medium in the two zones. In the gasification zone, a high-calorific value combustible gas of good quality is produced; in the oxidation zone, char and tar, which are difficult to gasify, are efficiently burned. Thus, it is possible to obtain a high gasification efficiency and a combustible gas of good quality. In the embodiment shown in FIG. 5, a Roots blower 15 is provided to communicate with both the double damper 12 and the free board 102 in the gasification apparatus 1, so that gas leaking out from the furnace 2 to the double damper 12 through the compression feeder 13 when the compression of refuse is insufficient is returned to the furnace 2 by the action of the Roots blower 15. Preferably, the Roots blower 15 sucks an appropriate amount of air and gas from the double damper 12 and returns it to the furnace 2 so that the pressure in the upper stage of the double damper 12 is equal to atmospheric pressure.

Further, the gasification apparatus shown in FIG. 5 has an incombustible matter discharge opening 5, a conical chute 16, a volume regulating discharger 17, a first swing valve 18 for sealing, a swing cut-off valve 19, a second swing valve 20 for sealing, and a discharger 23 equipped with a trommel, which are disposed in the mentioned order and operated as follows:

(1) In a state where the first swing valve 18 for sealing is open, while the second swing valve 20 is closed, and the furnace pressure is sealed by the second swing valve 20, the volume regulating discharger 17 is operated, so that incombustible matter including sand as a fluidized medium is discharged from the conical chute 16 to the swing cut-off valve 19.

(2) When the swing cut-off valve 19 has received a predetermined amount of incombustible matter, the volume regulating discharger 17 is switched off, and the first swing valve 18 is closed, so that the furnace pressure is sealed by the first swing valve 18. Further, a discharge valve 22 is opened, so that the pressure in the swing cut-off valve 19 is returned to the atmospheric pressure. Next, the second swing valve 20 is completely opened, and the swing cut-off valve 19 is opened, thereby allowing incombustible matter to be discharged to the discharger 23.

(3) After the second swing valve 20 has been completely closed, an equalizing valve 21 is opened. After the pressure in the first swing valve 18 and the pressure in the conical chute 16 have been equalized with each other, the first swing valve 18 is opened. Thus, the process returns to the first step (1).

These steps (1) to (3) are automatically repeated.

The discharger 23, which is equipped with a trommel, is continuously run. Thus, large-sized incombustible matter 27 is discharged to the outside of the system through the trommel, and sand and small-sized incombustible matter are transported by a sand circulating elevator 24. After finely-divided incombustible matter 28 has been removed by a classifier 25, the sand is returned to the gasification apparatus 1 through a lock hopper 26. In this incombustible matter discharging mechanism, the two swing valves 18 and 20 do not receive incombustible matter but have only a pressure seal function. Accordingly, it is possible to avoid biting of incombustible matter at the sealing portions of the first and second swing valves 18 and 20. In a case where the furnace pressure may be slightly negative, no seal function is required.

Figure 6:
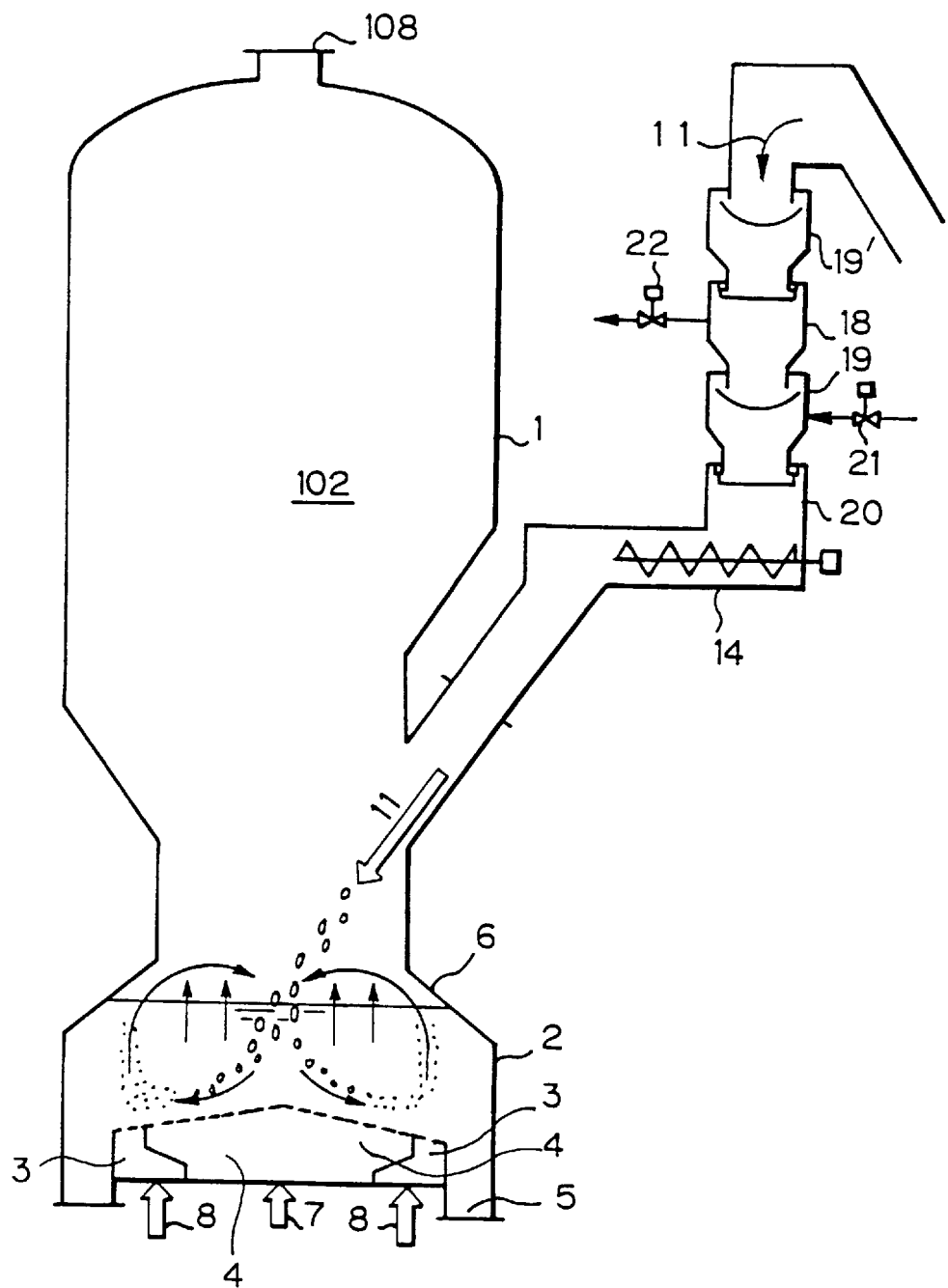
FIG. 6 is a schematic vertical sectional view of a gasification apparatus according to a fourth embodiment of the present invention.

FIG. 6 is a schematic vertical sectional view of a gasification apparatus according to a fourth embodiment of the present invention. In the gasification apparatus shown in FIG. 6, the feed of the gasification material 11 and the furnace pressure sealing operation related thereto are carried out by using a combination of a pair of swing cut-off valves 19 and 19' and a pair of first and second swing valves 18 and 20 in the same way as in the case of the mechanism for discharging incombustible matter shown in FIG. 5. The compression feeder 13 used in the embodiment shown FIG. 5 is omitted. In the embodiment shown in FIG. 6, gas leaking out from the furnace to the first swing valve 18 is returned to the furnace through a discharge valve 22 and a blower (not shown). Further, after the first swing valve 18 has been completely closed, the equalizing valve 21 is opened to equalize the pressure in the swing cut-off valve 19 with the pressure in the furnace.

Figure 7:
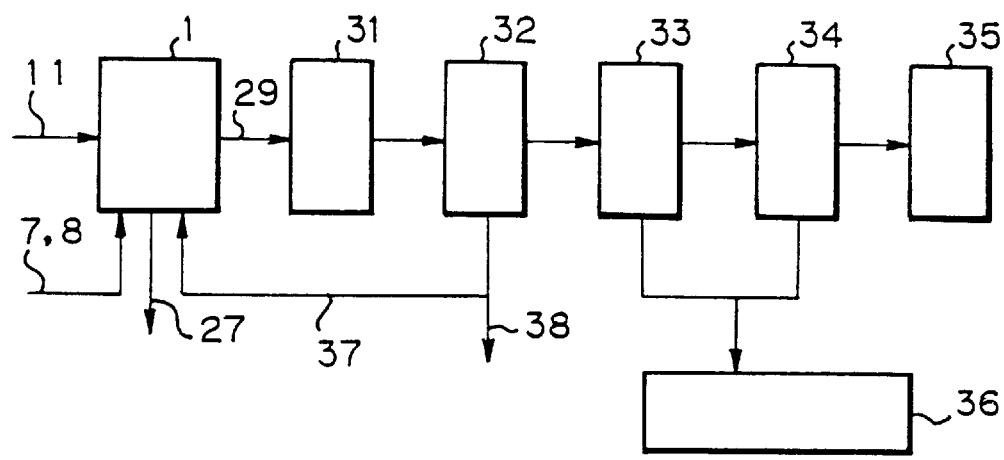
FIG. 7 is a flow chart showing one example of a process for refining the gas produced by the gasification apparatus of the present invention.

FIG. 7 is a flow chart showing one example of a process for refining the gas produced by the gasification apparatus of the present invention. In the refining process shown in FIG. 7, the gasification apparatus 1 is supplied with the gasification material 11 and the fluidizing gases 7 and 8. The combustible gas produced in the gasification apparatus 1 is sent to a waste heat boiler 31 where heat is recovered, and the gas thus cooled is then sent to a cyclone separator 32 where solid matter 37 and 38 is separated. Thereafter, the combustible gas is scrubbed and cooled in a water scrubbing tower 33, and hydrogen sulfide is removed from the combustible gas in an alkaline solution scrubbing tower 34. Thereafter, the combustible gas is stored in a gas holder 35. Unreacted char 37 in the solid matter separated in the cyclone separator 32 is returned to the gasification apparatus 1, and the remaining solid matter 38 is discharged to the outside of the system. Large-sized incombustible matter 27 in the incombustible matter discharged from the gasification apparatus 1 is discharged to the outside of the system, whereas sand in the incombustible matter is returned to the gasification apparatus 1, in the same way as in the embodiment shown in FIG. 5. Waste water from the scrubbing towers 33 and 34 is introduced into a waste water treatment device 36 where it is made harmless.

Figure 8:
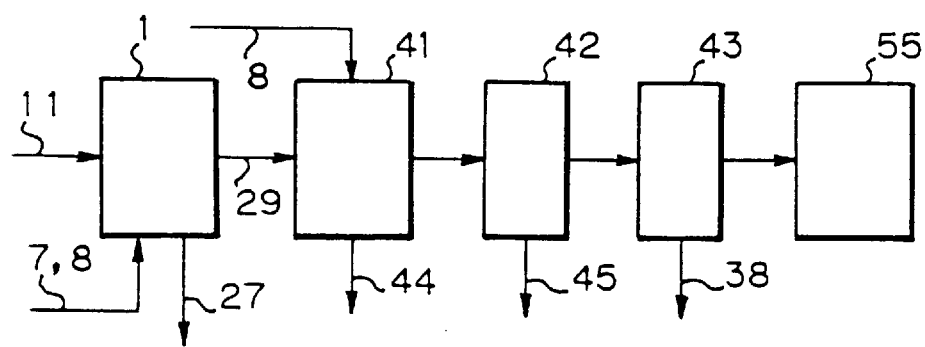
FIG. 8 is a flow chart showing one example of a process in which ash is melted.

FIG. 8 is a flow chart showing one example of a process in which the combustible gas and fine particles produced in the gasification apparatus 1 are introduced into a melt combustion furnace 41 where they are burned at high temperature, and the resulting ash is melted. In the process shown in FIG. 8, the combustible gas 29 containing a large amount of combustible component, which has been produced in the gasification apparatus 1, is introduced into the melt combustion furnace 41. The melt combustion furnace 41 is also supplied with the gas 8, which is one of three gases, i.e. oxygen, a gaseous mixture of oxygen and air, and air, so that the combustible gas and fine particles are burned at 1,300° C. or higher, and the resulting ash is melted. In addition, harmful substances, e.g. dioxins, PCB, etc., are decomposed. The molten ash 44 discharged from the melt combustion furnace 41 is cooled rapidly to form slag, thereby achieving waste volumetric reduction. Combustion exhaust gas generated from the melt combustion furnace 41 is cooled rapidly in a scrubber 42, thereby preventing resynthesis of dioxins. The exhaust gas cooled rapidly in the scrubber 42 is sent to a dust collector 43, e.g. a filter where dust 38 is removed from the gas. Then, the exhaust gas is discharged into the atmosphere from an exhaust tower 55.

Figure 9:
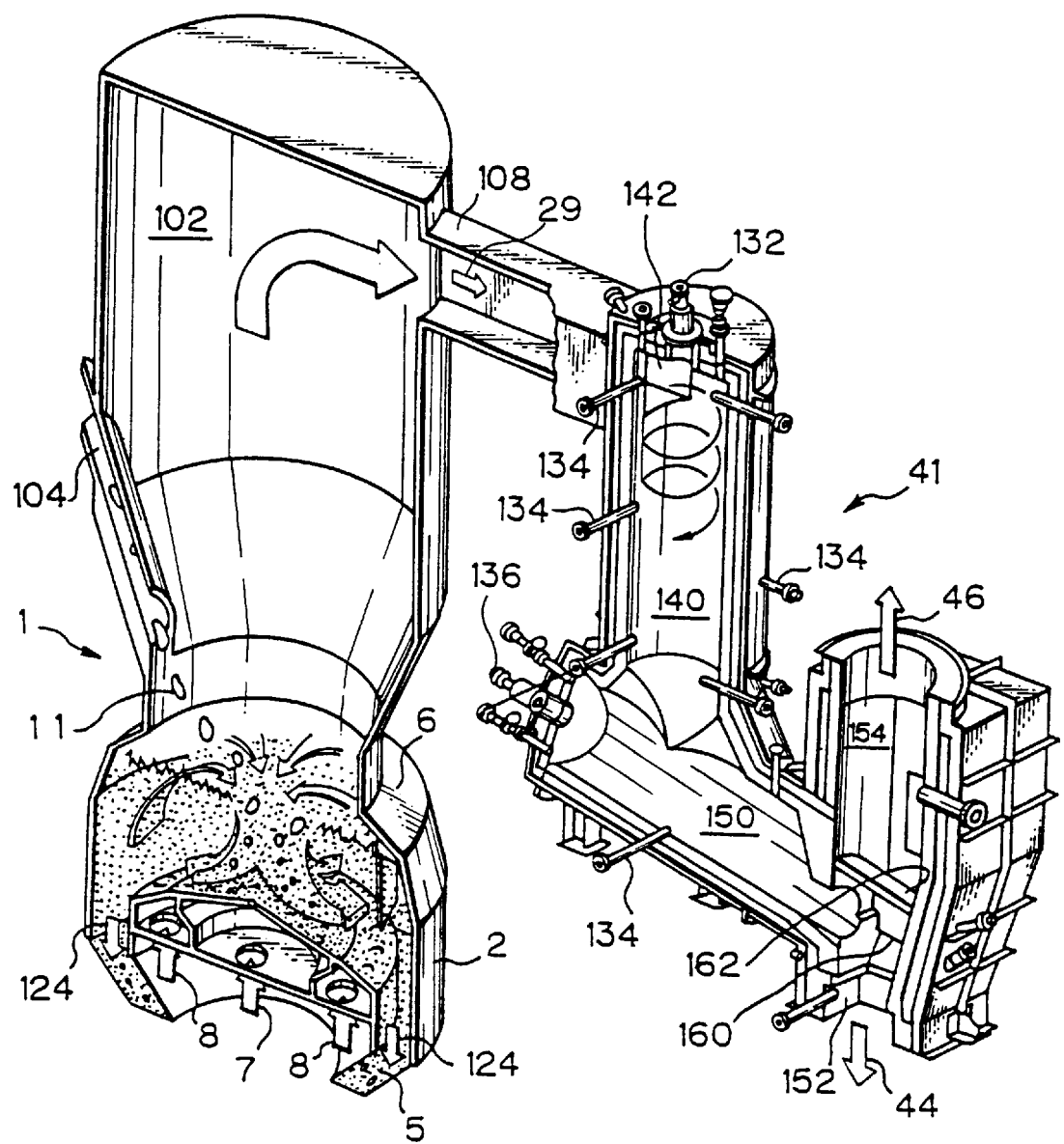
FIG. 9 is a schematic sectional perspective view of a gasification and melt combustion apparatus according to a fifth embodiment of the present invention.

FIG. 9 is a schematic sectional perspective view of a gasification and melt combustion apparatus according to a fifth embodiment of the present invention. Referring to FIG. 9, the gasification apparatus 1 is substantially the same as that in the embodiment shown FIG. 1. However, the gas outlet 108 is communicated with a combustible gas inlet 142 of the melt combustion furnace 41. The melt combustion furnace 41 includes a cylindrical primary combustion chamber 140 having an approximately vertical axis, and a secondary combustion chamber 150 which is inclined horizontally. Combustible gas 29 and fine particles produced in the fluidized-bed furnace 2 are supplied to the primary combustion chamber 140 through the combustible gas inlet 142 so as to circle about the axis of the primary combustion chamber 140.

The upper end of the primary combustion chamber 140 is provided with a starting burner 132 and a plurality of air nozzles 134 which supply combustion air so that the air circles about the axis of the primary combustion chamber 140. The secondary combustion chamber 150 is communicated with the primary combustion chamber 140 at the lower end thereof. The secondary combustion chamber 150 has a slag separator 160 and a discharge opening 152 which is disposed in the lower part of the secondary combustion chamber 150 so as to be capable of discharging molten ash 4, and an exhaust opening 154 which is disposed above the discharge opening 152. The secondary combustion chamber 150 further has an assist burner 136 which is disposed in the vicinity of that portion of the secondary combustion chamber 150 at which the chamber 150 communicates with the primary combustion chamber 140, and an air nozzle 134 for supplying combustion air. The exhaust opening 154 for discharging an exhaust gas 46 is provided with a radiating plate 162 to reduce the quantity of heat lost through the exhaust opening 154 by radiation.

Figure 10:
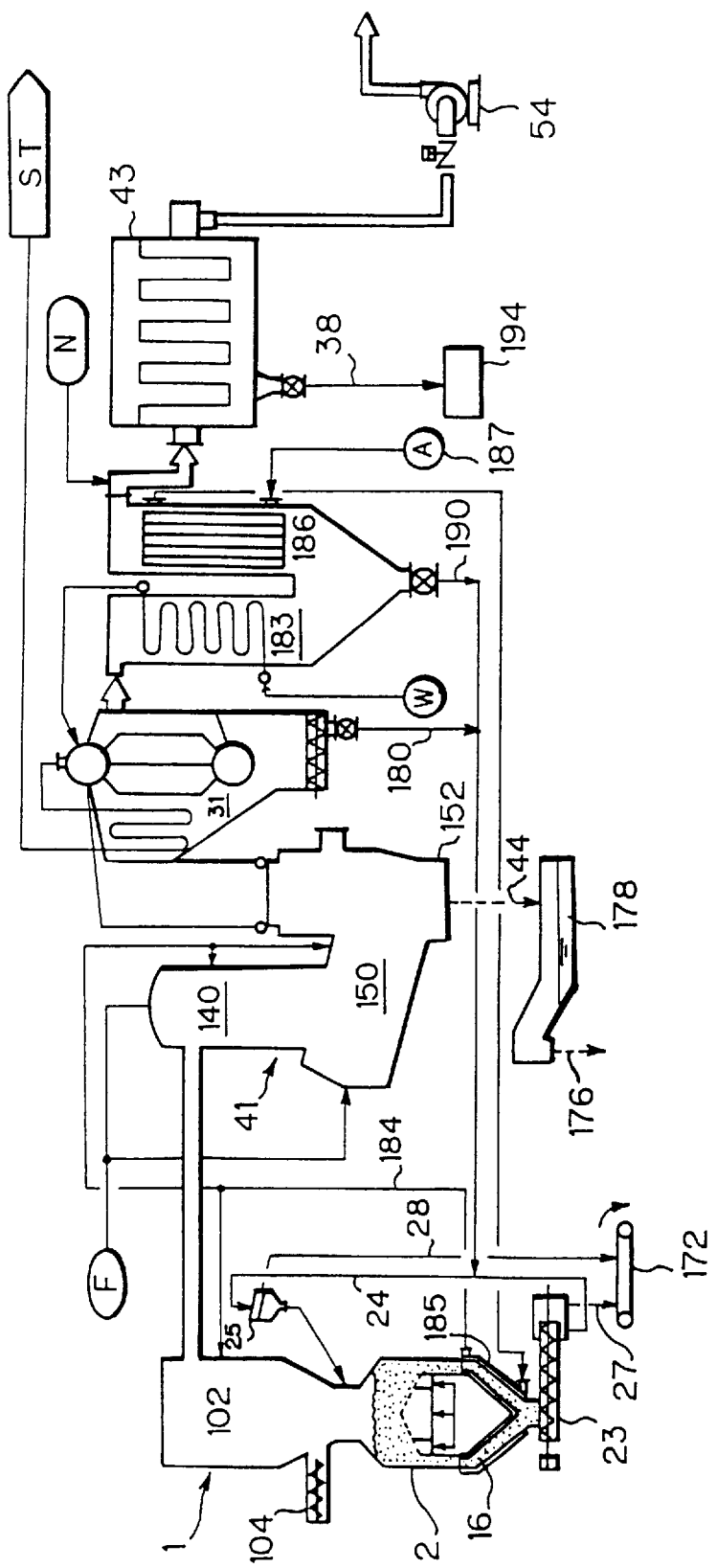
FIG. 10 shows the arrangement of a fluidized-bed gasification and melt combustion apparatus according to an embodiment of the present invention which is used in combination with a waste heat boiler and a turbine.

FIG. 10 shows the arrangement of a fluidized-bed gasification and melt combustion apparatus according to an embodiment of the present invention which is used in combination with a waste heat boiler and a turbine. Referring to FIG. 10, the gasification apparatus 1 has a conveyor 172 for transporting large-sized incombustible matter 27 discharged from the discharger 23, together with finely-divided incombustible matter 28 discharged from the classifier 25. An air jacket 185 is disposed around the conical chute 16 which is used to take out incombustible matter from the bottom of the fluidized-bed furnace 2. Air in the air jacket 185 is heated by high-temperature sand drawn out of the fluidized-bed furnace 2. An auxiliary fuel F is supplied to the primary and secondary combustion chambers 140 and 150 of the melt combustion furnace 41. Molten ash 44 discharged from the discharge opening 152 of the melt combustion furnace 41 is received into a water chamber 178 where it is cooled rapidly, and then discharged as slag 176.

In the arrangement shown in FIG. 10, combustion gas discharged from the melt combustion furnace 41 is discharged into the atmosphere through the waste heat boiler 31, an economizer 183, an air preheater 186, a dust collector 43, and an induced draft fan 54. A neutralizer N, e.g. slaked lime (calcium hydroxide), is added to the combustion gas coming out of the air preheater 186 before the gas enters the dust collector 43. Water W is supplied to the economizer 183 where it is preheated, and then heated in the boiler 31 to form steam. The steam is used to drive a steam turbine ST. Air A is supplied to the air preheater 186 where it is heated, and then further heated in the air jacket 185. The heated air is supplied through an air pipe 184 to the melt combustion furnace 41. If necessary, the heated air is also supplied to the free board 102.

Fine particles 180 and 190 collected in the bottoms of the waste heat boiler 31, the economizer 183 and the air preheater 186 are transported to the classifier 25 by the sand circulating elevator 24 to remove finely-divided incombustible matter 28 from them, and are then returned to the fluidized-bed furnace 2. Fly ash 38 separated in the dust collector 43 contains salts of alkali metals, e.g. Na, K, etc., volatilized at high temperature, and it is therefore treated with chemicals in a treating device 194.

In the apparatus shown in FIG. 10, combustion in the fluidized-bed furnace 2 is carried out by low-temperature partial burning method in low excess air ratio, and the fluidized-bed temperature is maintained in the range of from 450° C. to 650° C., thereby enabling a high-calorific value combustible gas to be produced. Further, since combustion takes place at a low excess air ratio under a reducing atmosphere condition, iron and aluminum are obtained as unoxidized valuables. The high-calorific value combustible gas and char produced in the fluidized-bed furnace 2 can be burned at high temperature, i.e. 1,300° C. or higher, in the melt combustion furnace 41. Thus, the ash can be melted, and dioxins can be decomposed.

Figure 11:
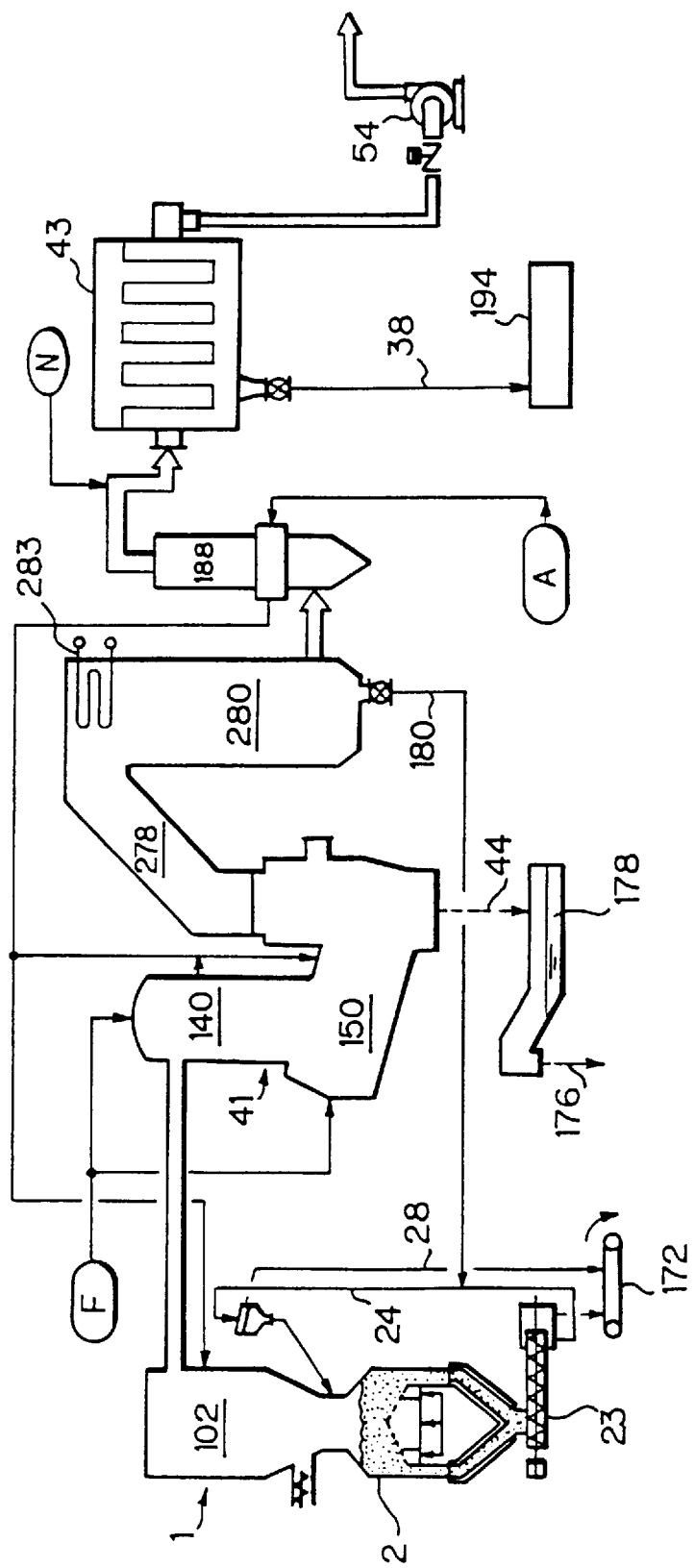
FIG. 11 shows the arrangement of a fluidized-bed gasification and melt combustion apparatus according to an embodiment of the present invention which is used in combination with a gas cooler.

FIG. 11 shows the arrangement of a fluidized-bed gasification and melt combustion apparatus according to an embodiment of the present invention which is used in combination with a gas cooler 280. Referring to FIG. 11, the gasification apparatus 1, the melt combustion furnace 41, the water chamber 178, the dust collector 43, the induced draft fan 54, etc., are the same as those in FIG. 10. In the arrangement shown in FIG. 11, a gas cooler 280 and an independent air preheater 188 are provided in place of the waste heat boiler. High-temperature combustion exhaust gas from the melt combustion furnace 41 is introduced into the gas cooler 280 through a high-temperature duct 278 coated with a thermal insulator. In the gas cooler 280, the combustion gas is instantaneously cooled down by spraying with fine water droplets, thereby preventing resynthesis of dioxins. The flow velocity of exhaust gas in the high-temperature duct 278 is set at a low level, i.e. 5 m/sec. or lower. A hot-water generator 283 is disposed in the upper part of the gas cooler 280. Air heated in the air preheater 188 is supplied to the free board 102 in the gasification apparatus 1 and also to the melt combustion furnace 41.

Figure 12:
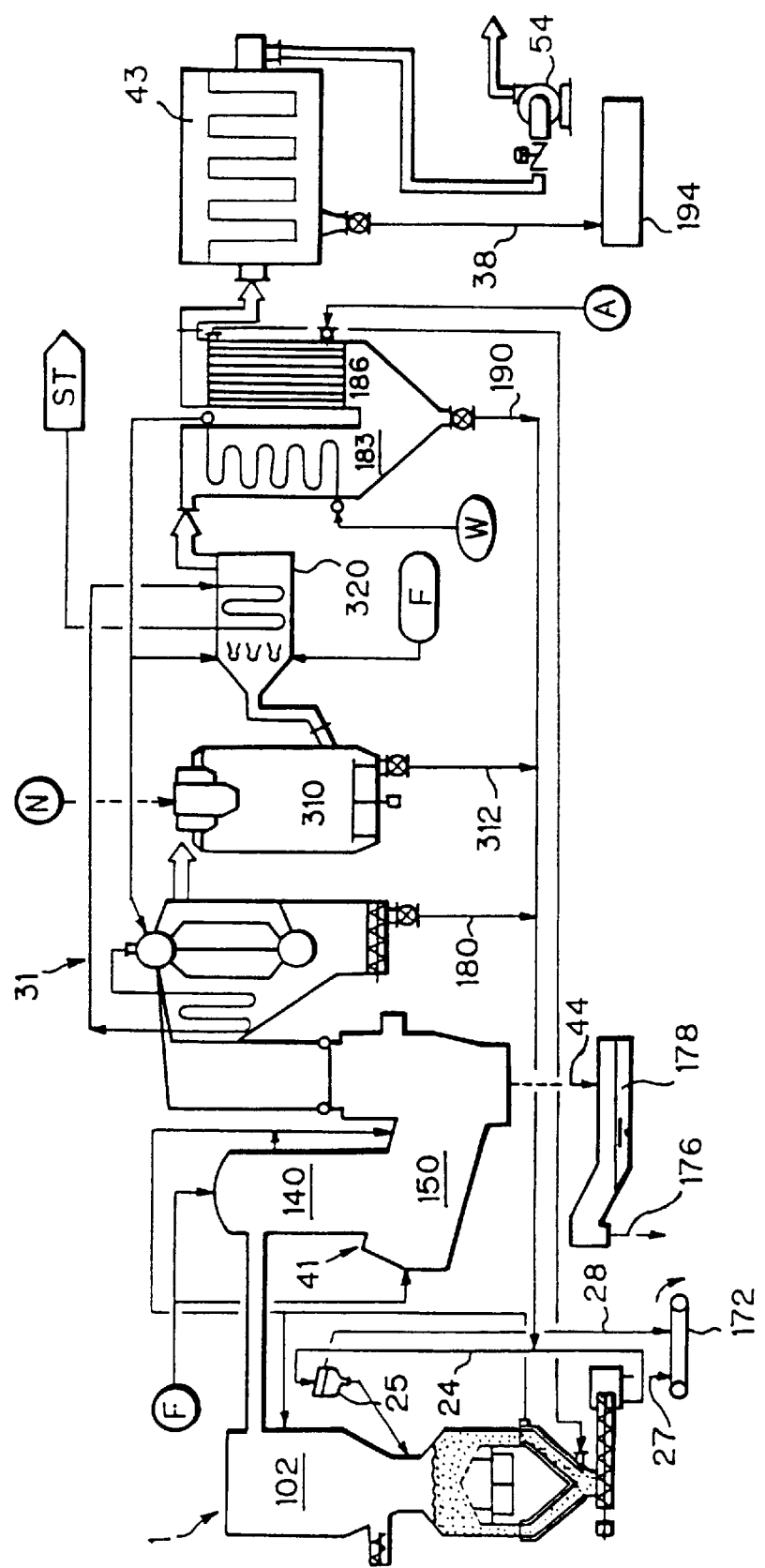
FIG. 12 shows the arrangement of a fluidized-bed gasification and melt combustion apparatus according to an embodiment of the present invention which is used in combination with a waste heat boiler and a reaction tower.

FIG. 12 shows the arrangement of a fluidized-bed gasification and melt combustion apparatus according to an embodiment of the present invention which is used in combination with the waste heat boiler 31 and a reaction tower 310. In FIG. 12, the gasification apparatus 1, the melt combustion furnace 41, the water chamber 178, the waste heat boiler 31, the steam turbine ST, the economizer 183, the air preheater 186, the dust collector 43, the induced draft fan 54, etc. are the same as those in FIG. 10. In the arrangement shown in FIG. 12, reaction tower 310 and a superheater heating combustor 320 are disposed between the waste heat boiler 31 and the economizer 183. In the reaction tower 310, a neutralizer N, e.g. slaked lime slurry, is added to the combustion exhaust gas, thereby removing HCl from the gas. Solid fine particles 312 discharged from the reaction tower 310, together with solid fine particles 180 discharged from the waste heat boiler 31, are sent to the classifier 25 by the sand circulating elevator 24. In the heating combustor 320, combustible gas and an auxiliary fuel F is burned to raise the steam temperature to about 500° C. In the apparatus shown in FIG. 12, the steam has a high temperature and high pressure, and the excess air ratio is low, and hence the quantity of sensible heat carried over by the exhaust gas is small. Therefore, the power generation efficiency can be increased to about 30%.

Figure 13:
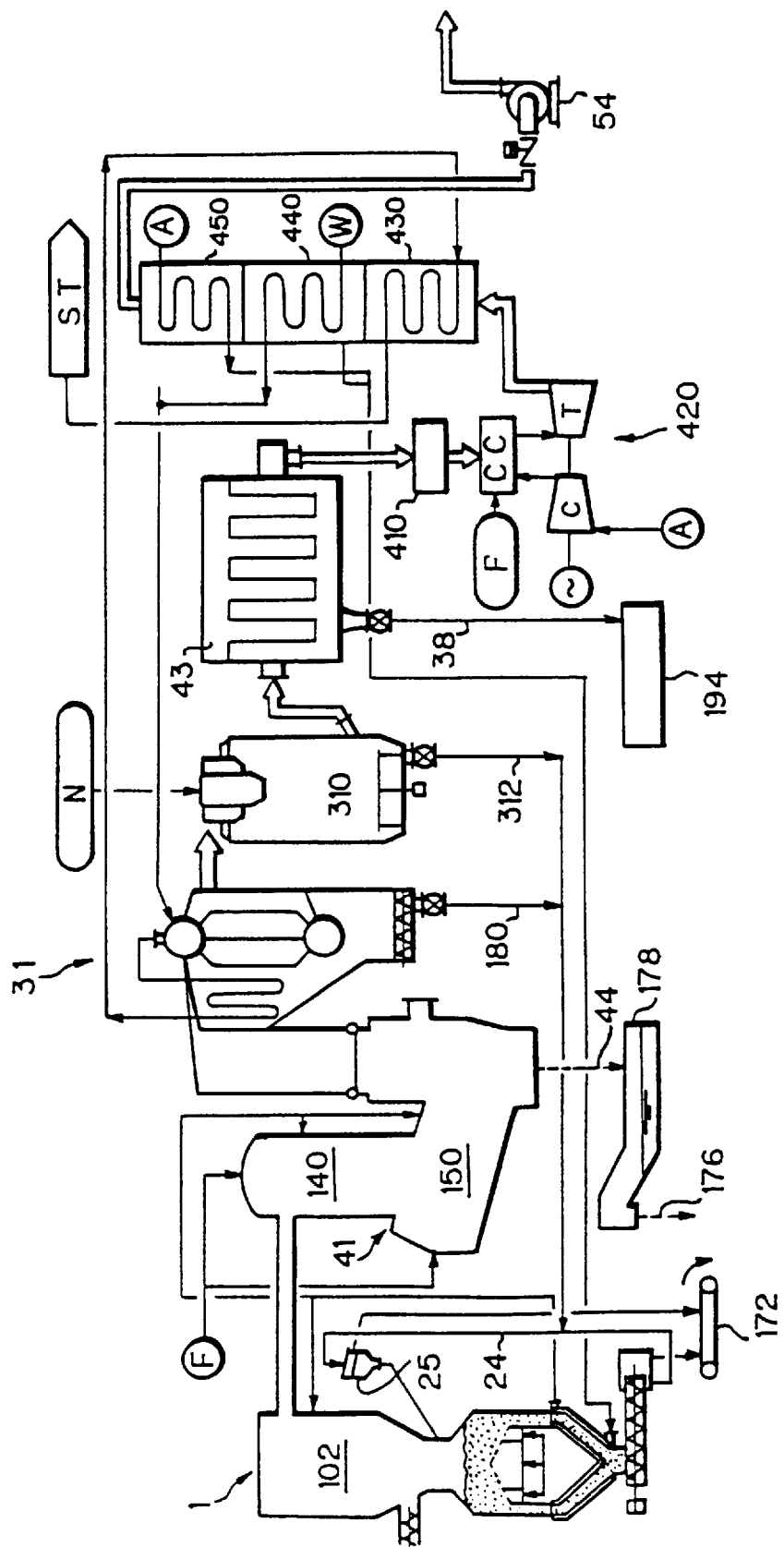
FIG. 13 shows the arrangement of a co-generation type fluidized-bed gasification and melt combustion apparatus according to an embodiment of the present invention.

FIG. 13 shows the arrangement of a co-generation type fluidized-bed gasification and melt combustion apparatus according to an embodiment of the present invention. In FIG. 13, the gasification apparatus 1, the melt combustion furnace 41, the water chamber 178, the waste heat boiler 31, the dust collector 43, the induced draft fan 54, etc. are the same as those in the apparatus shown in FIG. 10. Referring to FIG. 13, the reaction tower 310 is disposed between the waste heat boiler 31 and the dust collector 43. In the reaction tower 310, a neutralizer N, e.g. slaked lime slurry, is added to the combustion exhaust gas, thereby removing HCl. Exhaust gas from the reaction tower 310 is supplied through the dust collector 43 to a gas turbine assembly 420 where it is used. In the gas turbine assembly 420, air A is compressed by a compressor C, and the compressed air is supplied to a combustor CC. In the combustor CC, a fuel F is burned, and the resulting combustion gas, together with the exhaust gas which is compressed in a compressor 410 and supplied to the combustor CC, is used as a working fluid for a turbine T. Exhaust gas from the gas turbine assembly 420 is passed through a superheater 430, an economizer 440 and an air preheater 450 in the mentioned order and then released into the atmosphere by the induced draft fan 54. Steam generated in the waste heat boiler 31 is heated by the exhaust gas from the gas turbine assembly 420 in the superheater 430, and the heated steam is supplied to the steam turbine ST.

Figure 14:
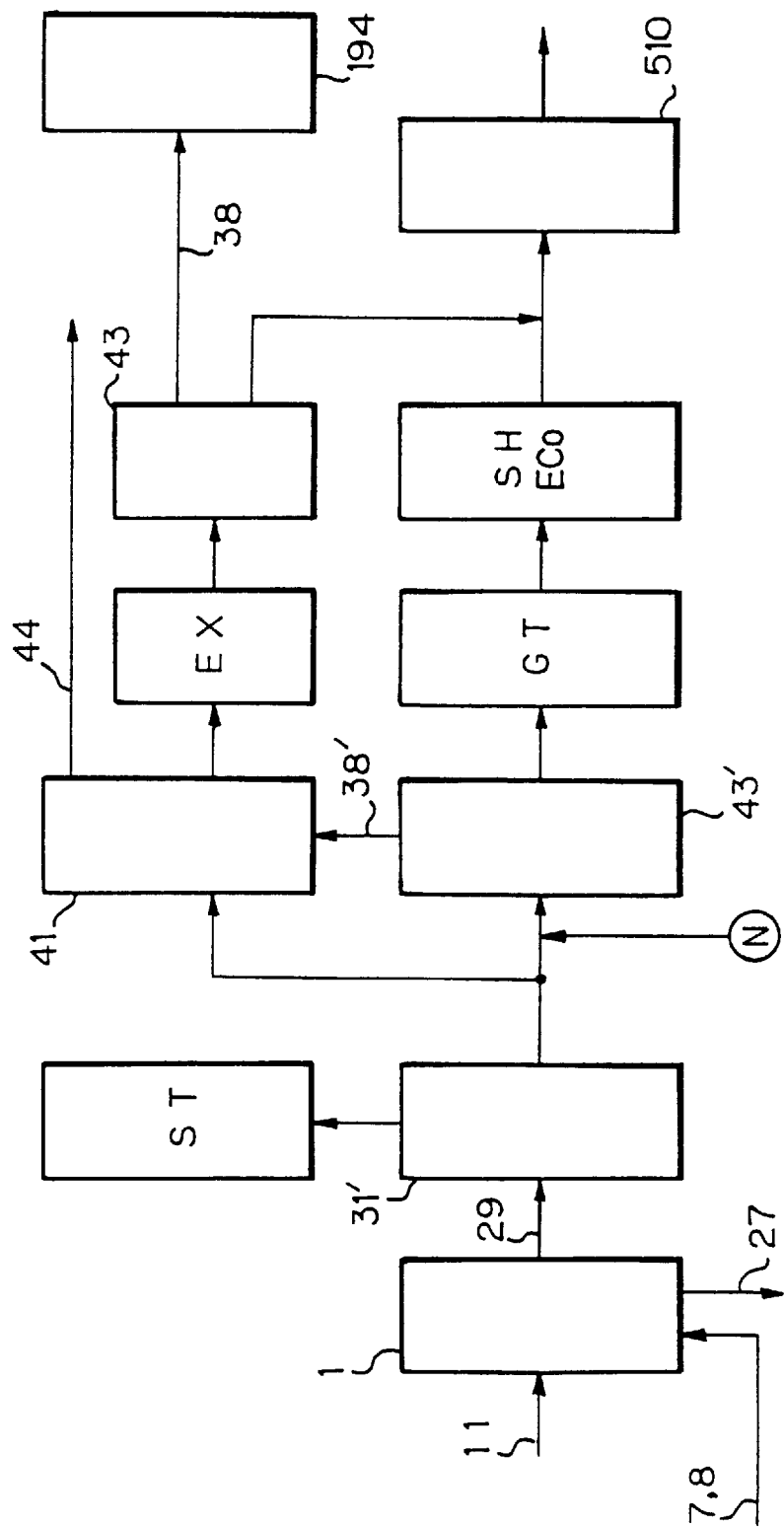
FIG. 14 is a flow chart showing the process of a pressurized gasification combined-cycle power generation type fluidized-bed gasification and melt combustion method according to an embodiment of the present invention.

FIG. 14 is a flow chart showing the process of a pressurized gasification combined-cycle power generation type fluidized-bed gasification and melt combustion method according to an embodiment of the present invention. High-temperature and high-pressure combustible gas 29 produced in the pressurized gasification furnace 1 is introduced into a waste heat boiler 31' where it causes steam to be generated, and the gas itself is cooled. The gas coming out of the waste heat boiler 31' is divided into two, one of which is introduced into the melt combustion furnace 41, and the other is introduced into a dust collector 43' after a neutralizer N has been added thereto to neutralize HCl. In the dust collector 43', low-melting substances 38' in the combustible gas which have solidified because of fall in temperature are separated from the combustible gas and sent to the melt combustion furnace 41 where the low-melting substances 38' are melted. The combustible gas which has been ridded of the low-melting substances 38' is used as a fuel gas in the gas turbine assembly GT. Exhaust gas from the gas turbine assembly GT is subjected to heat exchange in a superheater SH and an economizer Eco, and thereafter, it is treated in an exhaust gas treating device 510 and then released into the atmosphere. Exhaust gas from the melt combustion furnace 41 is passed through a heat exchanger EX and the dust collector 43 and introduced into the exhaust gas treating device 510. Molten ash 44 discharged from the melt combustion furnace 41 is cooled rapidly to form slag. Solid matter 38 discharged from the dust collector 43 is treated with chemicals in the treating device 194.

With the process shown in FIG. 14, a gas produced from waste matter is used as a fuel after HCl and solid matter have been removed therefrom. Accordingly, the gas turbine will not be corroded by the gas. Further, since HCl has been removed from the gas, high-temperature steam can be generated by the gas turbine exhaust gas. (Effects of the Invention)

Accordingly, the present invention provides the following advantageous effects:

(1) In the gasification apparatus of the present invention, heat is diffused by circulating streams in the fluidized-bed furnace. Therefore, high intensity combustion can be realized, and the furnace can be reduced in size.

(2) In the present invention, the fluidized-bed furnace can maintain combustion with a relatively small amount of air. Therefore, it is possible to produce a homogeneous gas containing a large amount of combustible component by gently carrying out low-excess air ratio and low-temperature (450° C. to 650° C.) combustion in the fluidized-bed furnace and thus minimizing heat generation. Thus, the greater part of combustible matter contained in the gas, tar and char can be effectively utilized in a melt combustion furnace at the following stage.

(3) In the present invention, even large-sized incombustible matter can be readily discharged by the action of the circulating streams in the fluidized-bed furnace. In addition, iron and aluminum contained in the incombustible matter can be utilized as unoxidized valuables.

(4) The present invention provides a method or equipment whereby refuse treatment can be made harmless, and a high energy utilization factor can be attained.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A method of processing combustible material containing incombustible matter, said method comprising:

providing a fluidized bed of fluidized medium within a fluidized-bed reactor by supplying thereto an upward flow of fluidizing gas;

creating within said fluidized bed a circulating flow of said fluidized medium within said reactor by causing said upward flow of fluidizing gas to a first area of said bed to be of a greater mass velocity than to a second area of said bed, whereby said fluidized medium moves upwardly in said first area of said bed as an oxidization zone, and said fluidized medium moves downwardly in said second area of said bed as a gasification zone;

introducing a supply of said combustible material to be processed onto said fluidized bed such that said combustible material moves downwardly with said fluidized medium in said second area of said bed, thereby gasifying said combustible material in said gasification zone and generating combustible gas and char, and such that said char moves upwardly with said fluidized medium in said first area of said bed and is partially oxidized in said oxidization zone to form char particles;

discharging through an outlet said incombustible matter contained in said supply of combustible material and fluidized medium from said reactor, separating the thus discharged fluidized medium from said incombustible matter, and returning the thus separated fluidized medium to said bed in said reactor;

preventing said combustible gas from discharging through said outlet;

discharging said combustible gas and char particles together from said reactor and introducing the thus discharged combustible gas and char particles together into a high temperature furnace;

combusting said combustible gas and said char particles at a temperature of at least 1300° C. within said furnace and thereby decomposing harmful substances and melting resultant ash; and discharging the thus melted ash as molten slag.

2. A method as claimed in claim 1, wherein said combustible gas and char particles discharged from said reactor are introduced directly into said furnace without being separated by a separator device.

3. A method as claimed in claim 1, wherein said second area of said bed comprises a central area thereof, and said first area of said bed comprises a peripheral area thereof surrounding said central area.

4. A method as claimed in claim 3, further comprising creating an annular intermediate area of said bed between said central area thereof and said peripheral area thereof by causing said upward flow of fluidizing gas to said annular intermediate area to be of a mass flow velocity intermediate between said mass flow velocities of said central area and said peripheral area.

5. A method as claimed in claim 1, wherein said fluidizing gas in said second area comprises at least one gas selected from the group consisting of steam, a gaseous mixture of steam and air, and air.

6. A method as claimed in claim 1, wherein said fluidizing gas in said first area comprises at least one gas selected from the group consisting of oxygen, a gaseous mixture of oxygen and air, and air.

7. A method as claimed in claim 1, wherein said incombustible matter and fluidized medium are discharged through said outlet from a lowermost portion of said fluidized bed.

8. A method as claimed in claim 1, wherein said incombustible matter and fluidized medium are discharged through said outlet from a position adjacent said oxidization zone.

9. A method as claimed in claim 1, wherein said discharging said incombustible matter and fluidized medium through said outlet comprises operating a volume regulating discharger to move said incombustible matter and fluidized medium past a valve, then stopping operation of said volume regulating discharger, and then closing said valve.

10. A method as claimed in claim 1, further comprising maintaining interiors of said fluidized-bed reactor and said high temperature furnace in communication and at a common pressure.

11. A method as claimed in claim 10, wherein said common pressure is greater than atmospheric pressure.

12. A method as claimed in claim 1, wherein said combustible material comprises waste matter.

13. A method as claimed in claim 1, wherein said introducing said supply of combustible material comprises supplying said supply of combustible material to said fluidized-bed reactor via material feeding equipment while preventing leakage of said combustible gas from said fluidized-bed reactor through said material feeding equipment.

14. A method as claimed in claim 1, further comprising introducing combustion gas resulting from said combusting in said high temperature furnace into a water scrubber, thereby preventing resynthesis of dioxins, and then into a filter and thereby removing dust.

15. A method as claimed in claim 1, wherein said preventing said combustible gas from discharging through said outlet comprises filling said discharged fluidized medium and incombustible matter into a chute for discharging said incombustible matter.

16. A method as claimed in claim 1, wherein said preventing said combustible gas from discharging through said outlet comprises discharging said incombustible matter from said outlet through at least one valve.

17. A method as claimed in claim 1, wherein said fluidized medium comprises siliceous sand.

18. A method as claimed in claim 1, wherein pulverization of said char is achieved by said bed.

19. An apparatus for processing combustible material containing incombustible matter, said apparatus comprising:
  a fluidized-bed reactor having therein a bed of fluidized medium;
  means for creating within said fluidized bed a circulating flow of said fluidized medium within said reactor by causing said upward flow of fluidizing gas to a first area of said bed to be of a greater mass velocity than to a second area of said bed, whereby said fluidized medium moves upwardly in said first area of said bed as an oxidization zone, and said fluidized medium moves downwardly in said second area of said bed as a gasification zone;
  means for introducing a supply of the combustible material to be processed onto said fluidized bed such that the combustible material moves downwardly with said fluidized medium in said second area of said bed, thereby gasifying the combustible material in said gasification zone and generating combustible gas and char, and such that the char moves upwardly with said fluidized medium in said first area of said bed and is partially oxidized in said oxidization zone to form char particles;
  means for discharging through an outlet the incombustible matter contained in the supply of combustible material and fluidized medium from said reactor, separating the thus discharged fluidized medium from the incombustible matter, and returning the thus separated fluidized medium to said bed in said reactor;
  means for preventing the combustible gas from discharging through said outlet;
  a high temperature furnace operable at a temperature of at least 1300° C.;
  means for discharging the combustible gas and char particles together from said reactor and introducing the thus discharged combustible gas and char particles together into said high temperature furnace, thus combusting the combustible gas and char particles at said temperature of at least 1300° C. and thereby decomposing harmful substances and melting resultant ash; and
  means for discharging the thus melted ash as molten slag.

20. An apparatus as claimed in claim 19, wherein said means for discharging the combustible gas and char particles from said reactor is operable to introduce the combustible gas and char particles directly into said furnace without being separated by a separator device.

21. An apparatus as claimed in claim 19, wherein said second area of said bed comprises a central area thereof, and said first area of said bed comprises a peripheral area thereof surrounding said central area.

22. An apparatus as claimed in claim 21, wherein said means for creating is operable to create an annular intermediate area of said bed between said central area thereof and said peripheral area thereof by causing said upward flow of fluidizing gas to said annular intermediate area to be of a mass flow velocity intermediate between said mass flow velocities of said central area and said peripheral area.

23. An apparatus as claimed in claim 19, wherein said fluidizing gas in said second area comprises at least one gas selected from the group consisting of steam, a gaseous mixture of steam and air, and air.

24. An apparatus as claimed in claim 19, wherein said fluidizing gas in said first area comprises at least one gas selected from the group consisting of oxygen, a gaseous mixture of oxygen and air, and air.

25. An apparatus as claimed in claim 19, wherein said means for discharging the incombustible matter and fluidized medium through said outlet is operable to discharge from a lowermost portion of said fluidized bed.

26. An apparatus as claimed in claim 19, wherein said means for discharging the incombustible matter and fluidized medium throough said outlet is operable to discharge from a discharge position adjacent said oxidation zone.

27. An apparatus as claimed in claim 19, wherein said means for discharging the incombustible matter and fluidized medium comprises a valve and a volume regulating discharger operable to move the incombustible matter and fluidized medium past said valve, said volume regulating discharger and said valve being relatively operable such that said valve is closed after operation of said volume regulating discharger is stopped.

28. An apparatus as claimed in claim 19, wherein interiors of said fluidized-bed reactor and said high temperature furnace are in communication and at a common pressure.

29. An apparatus as claimed in claim 28, wherein said common pressure is greater than atmospheric pressure.

30. An apparatus as claimed in claim 19, wherein the combustible material is waste matter.

31. An apparatus as claimed in claim 19, wherein said means for introducing comprises material feeding equipment operable to prevent leakage therethrough of the combustible gas from said fluidized-bed reactor.

32. An apparatus as claimed in claim 19, further comprising a water scrubber to receive combustion gas resulting from said combusting in said high temperature furnace and to scrub such combustion gas, thereby preventing resynthesis of dioxins, and a filter for filtering the thus scrubbed combustion gas.

33. An apparatus as claimed in claim 19, wherein said means for preventing the combustible gas from discharging through said outlet comprises a chute into which is filled the discharged fluidized medium and incombustible matter for discharging the incombustible matter.

34. An apparatus as claimed in claim 19, wherein said means for preventing the combustible gas from discharging through said outlet comprises at least one valve for receiving the incombustible matter from said outlet.

35. An apparatus as claimed in claim 19, wherein said fluidized medium comprises siliceous sand.

36. An apparatus as claimed in claim 19, wherein said bed is operable to pulverize the char.

* * * * *